Aug. 31, 1965  H. W. HOSFORD, JR  3,204,230
FLUID LEVEL INDICATOR
Filed Jan. 29, 1962
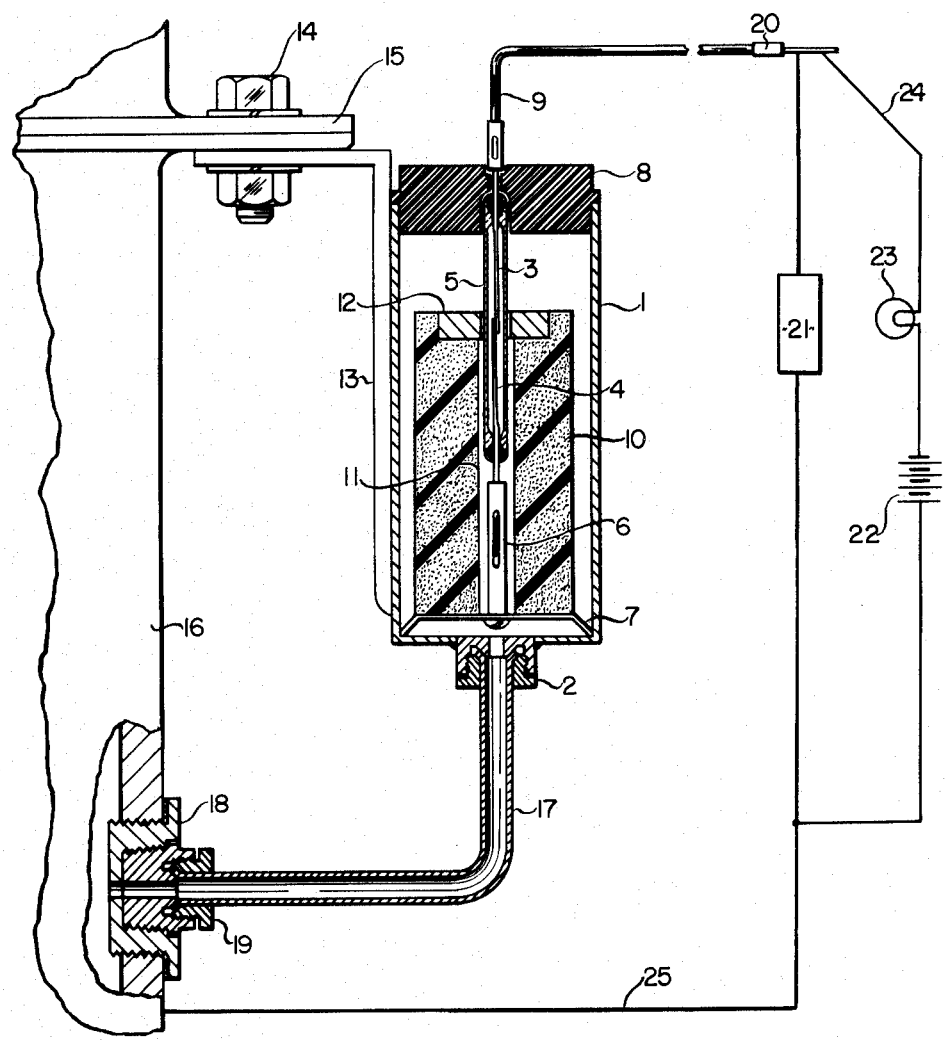
INVENTOR.
HARRY W. HOSFORD, JR.
BY
Oberlin, Maky & Donnelly
ATTORNEYS United States Patent Office 3,204,230
Patented Aug. 31, 1965

3,204,230
FLUID LEVEL INDICATOR
Harry W. Hosford, Jr., 2565 Stratford Road,
Cleveland Heights, Ohio
Filed Jan. 29, 1962, Ser. No. 169,474
3 Claims. (Cl. 340—244)

This invention relates as indicated to a fluid level indicator, and more particularly to an indicator especially suitable for use in automotive vehicles and the like to show when the engine lubricating oil level has dropped to a predetermined point.

A wide variety of fluid level indicators have been employed in the past for various purposes including that of showing the lubricating oil level in internal combustion engines of automotive vehicles. At the present time, however, there has been a strong trend to dispense with such devices in favor of indicators showing sufficient or insufficient oil pressure when the engine is in operation. While this latter type of indicator serves a useful purpose, it, of course, will not inform the operator when the oil level has dropped to a point where more oil should desirably be added if the level has in fact not yet dropped to such a low point as to interfere with the development of proper pumping pressure. As a general precaution, and particularly when driving at night or for long distances between filling stations, it is highly desirable that the operator be informed whenever the oil level drops to a point where another quart of oil should be added.

It is accordingly an important object of this invention to provide a fluid level indicator especially adapted to be installed in automotive vehicles to show when the engine oil level has dropped to a predetermined point.

A further object is to provide such indicator which may quickly and easily be installed on existing automotive engines and which may, if desired, be employed in conjunction with an existing fluid pressure indicator.

Still another object is to provide such fluid level indicator which is of inexpensive construction and yet highly reliable in operation.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

The single figure of the annexed drawing shows a fluid level indicator embodying the principles of the invention in vertical section, together with a diagram of a suitable electric circuit for employment in conjunction therewith.

Referring now more particularly to said drawing, the fluid level indicator illustrated therein comprises a cylindrical sheet metal shell or can 1 which may be formed as an impact extrusion and provided with a flared tube fitting 2 at its lower end. A commercially available 12 volt 1 ampere switch is mounted within such can, such switch comprising two narrow flat steel (or other magnetizable material) contact elements or strips 3 and 4 having overlapping end portions with their other ends sealed in the respective end portions of elongated glass tube 5. The overlapping end portions of such switch elements are normally separated but are adapted to be brought in resilient contact with one another by means explained below. The lower end of element 4 protruding from the lower end of glass tube 5 is secured in an electrically conductive stud 6 mounted on a sheet metal spider 7 fitting within the lower end of can 1 and effective to space such stud 6 a short distance above the lower end of such can. The upper end of tube 54 fits within a recess in cap 8 which may, for example, be of non-conductive synthetic plastic material, the upper lead 9 from switch element 3 passing through such cap with sufficient clearance also to vent the interior of can 1.

A cylindrical float 10 which may be of foamed polyurethane, for example, having a density of 2.3 pounds per cubic foot is provided with a central bore 11 to permit it to be fitted over glass tube 5 with sufficient clearance for vertical reciprocation relative thereto. The lowermost position of such float is determined by engagement with metal spider 7 and the uppermost position will in practice be determined by the maximum oil level in the engine sump. An annular magnet 12 in the form of a thick washer which may be of "Alnico," for example, is mounted in the upper end of float 10 to fit closely about glass tube 5 while still being capable of vertical reciprocation relative thereto, such float being dimensioned to support such magnet in horizontal alignment with the overlapping portions of switch elements 3 and 4 when such float is in lowermost position in engagement with spider 7. When thus positioned, magnet 12 is effective to cause the overlapping portions of switch elements 3 and 4 to be moved into contact with one another.

The can 1 is carried by a mounting bracket 13 which is adapted to be secured by means of engine oil pan bolt 14 on the horizontal flange assembly 15 of engine oil pan 16. Such bracket will be selected or adjusted to position can 1 at a level where the float will be deposited upon spider 7 when the oil level in such oil pan has dropped a predetermined amount below the "full" point, as for example one quart therebelow. A quarter inch tube 17 is secured to the lower end of can 1 by means of flared tube fitting 2 and its other end is secured to drilled drain plug 18 by means of flared tube fitting 19. It will be seen, therefore, that oil from pan 16 will enter can 1 and assume the same level therein, raising float 10 accordingly.

Switch contact 4 is grounded through stud 6, spider 7, can 1 and bracket 13 to the engine oil pan. Lead 9 from upper switch contact element 3 may terminate in a clip 20 which may be connected to the existing normally open pressure switch 21 which is in circuit with the battery 22 and indicator lamp 23. Clip 20 is also connected to line 24 leading to light 23, and pressure switch 21 is connected to ground through line 25. It will thus be seen that the oil level indicating switch comprising elements 3 and 4 will be in parallel to the pressure switch 21 so that closing of either of such switches will have the effect of illuminating indicator light 23 which will normally be located at the dashboard of the automobile. When such light comes on, the operator will ordinarily add a quart of oil which will cause float 10 to rise, and contacts 3, 4 to open. If the light still remains on, then it will be apparent that there is trouble in the oil circulating system. Of course, it will be appreciated that the conventional pressure switch 21 may be omitted entirely if desired and full reliance placed on the oil level indicator.

The spider 7 not only serves to ground switch element 4, but also facilitates liquid flow through tube 17 into can 1 and provides a small sludge chamber below float 10. Such float should, of course, be of substantially nonabsorbent material, such as closed cell foamed polyurethane. The poles of magnet 12 are at the respective axial ends thereof to produce the field tending to bring the overlapping portions of switch contacts 3 and 4 together when such magnet is horizontally aligned therewith.

The fluid level indicator of this invention is obviously adapted to be employed in any situation where it may be desired to indicate a predetermined change in the level of a liquid. It is of inexpensive construction and simple to install but nevertheless precise, accurate and reliable in operation. When employing it, the automobile driver will be warned whenever the oil level has dropped sufficiently to warrant the addition of more oil, without permitting the level to drop to the danger zone.

Other modes of applying the principle of this invention may be employed, change being made as regards the details described, provided the features stated in any of the following claims or the equivalent of such be employed.

I therefore particularly point out and distinctly claim as my invention:

1. In a fluid level indicator system for the oil sump of an internal combustion automotive vehicle and the like, a switch device comprising a vertical cylindrical metal can, a fluid inlet tube having one end connected to the bottom of said can and the other end in communication with said oil sump, a cover of insulating material for said can, the upper part of said can being vented to permit rise and fall of the oil level therein corresponding to that in said sump, a conductive spider inside the lower end of said can, a central vertical conductive stud mounted on said spider spaced upwardly thereby from the bottom of said can, an electric switch comprising an elongated sealed non-conductive tube having a pair of magnetizable contact elements extending longitudinally inwardly from the respective ends of said tube with normally resiliently spaced overlapping end portions adapted to be drawn into contact with each other by a magnetic field surrounding said overlapping end portions, the lower end of said tube being mounted on said stud with the corresponding said contact element electrically connected with the latter, the upper end of said tube being received in a recess in said cover, a float within said can having a vertical bore through which said tube passes, said float being adapted to rest upon said spider in lowermost position and being of a length less than the distance between said spider and said cover to permit substantial vertical reciprocation of said float as the fluid level within said can rises and falls, an annular permanent magnet supported by said float and encircling said tube, said magnet positioned on said float to lie in the same horizontal plane as the overlapping end portions of said contact elements when said float is in engagement with said spider to provide said magnetic field, and an electric battery and signal means in circuit with said switch, said signal means being adapted to be actuated by said battery when said switch is closed to signal that the fluid in said oil sump has dropped to a predetermined level.

2. A liquid level indicator for use in a container of liquid having a variable level, having switch means comprising a vertically disposed elongated tube, normally open switch contact elements within said tube adapted to be brought together under influence of a magnetic field, an annular magnet encircling said tube for relative vertical reciprocation into and out of contact actuating position, one of said switch contact elements being mounted on an electrically conductive stud, an electrically conductive spider means disposed adjacent the lower end of said container supporting said stud adjacent the axial center of said container, said stud extending upwardly from said spider means with its longitudinal axis substantially coinciding with the longitudinal axis of said container and slightly spaced from said lower end, said spider means providing an electrically conductive path between said container and said stud, float means supporting said magnet for rise and fall with the liquid level in said container into and out of said contact actuating position, said spider means defining with said container a sludge chamber below said float means, and signal means in electric circuit with said switch contact elements operative to provide a signal when said switch contact elements are brought together as aforesaid.

3. An external accessory for connection to the oil sump of an internal combustion automotive vehicle comprising a vertical cylindrical container, a fluid inlet tube connected to the bottom of said container with the other end thereof connectable to said oil sump, a cover of insulating material on said container, a vertically disposed elongated tube within said container with normally open switch contact elements therein, one of said contact elements being mounted on a stud, spider means disposed adjacent the lower end of said container and supporting said stud centrally within said container and spaced from said lower end with the longitudinal axis of said stud coinciding with the longitudinal axis of said container, float means within said container surrounding said tube, annular magnet means encircling said tube and supported by said float means, and signal means in electrical circuit with said switch contact elements, said signal means, when actuated, being adapted to provide a signal, said float and magnet means rising and falling with the liquid level in said container, said magnet means being effective to close said contact elements when said liquid level descends to a low level within said container whereat said contact elements are brought under the influence of the magnetic field of said magnet means and thereby activate said signal means.

References Cited by the Examiner

UNITED STATES PATENTS

| 1,364,295 | 1/21 | Mitchell | 340—59 |
| 1,496,306 | 6/24 | Duhamel | 340—59 |
| 1,813,382 | 7/31 | Chappell | 340—59 |
| 2,406,021 | 8/46 | Little | 200—87 |
| 2,820,865 | 1/58 | McKinnies | 200—84.3 |
| 2,927,176 | 3/60 | Auld et al. | 200—84.3 XR |
| 3,046,475 | 7/62 | Binford | 340—244 XR |

FOREIGN PATENTS

| 669,932 | 4/52 | Great Britain. |

THOMAS B. HABECKER, *Acting Primary Examiner.*

NEIL C. READ, *Examiner.*